Patented July 29, 1930

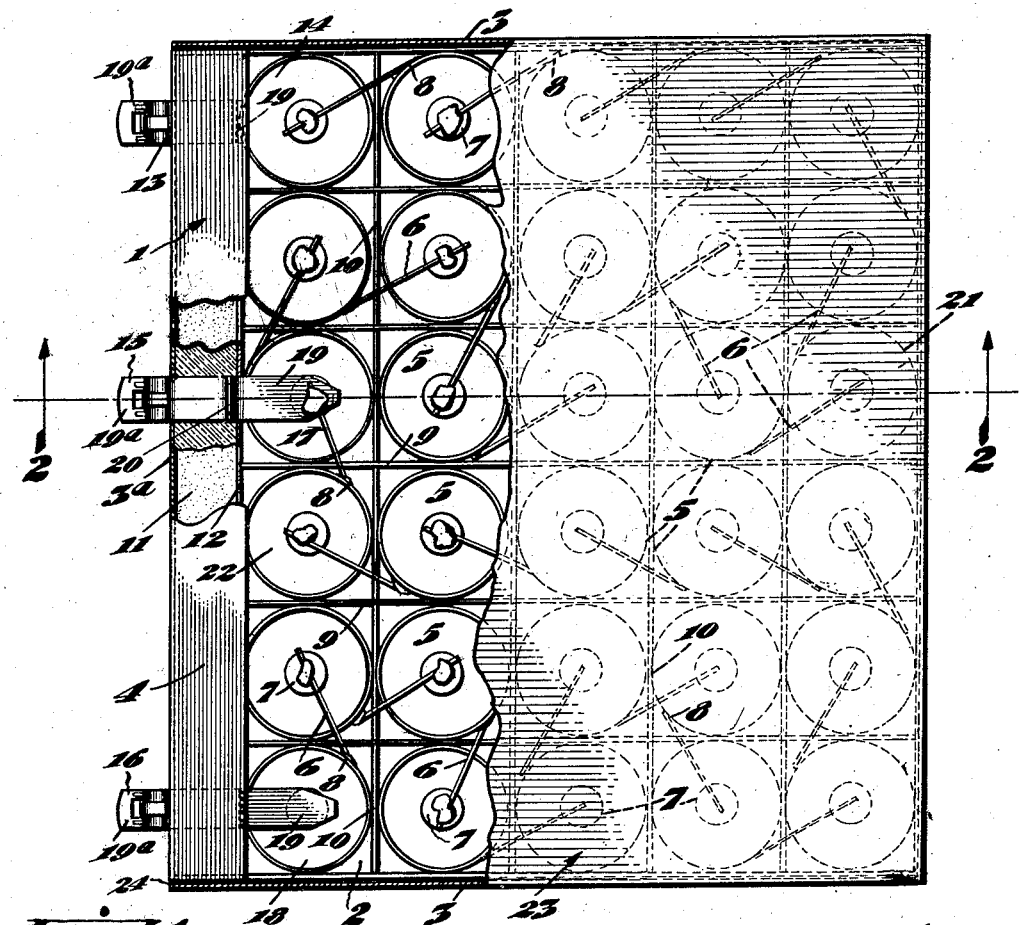
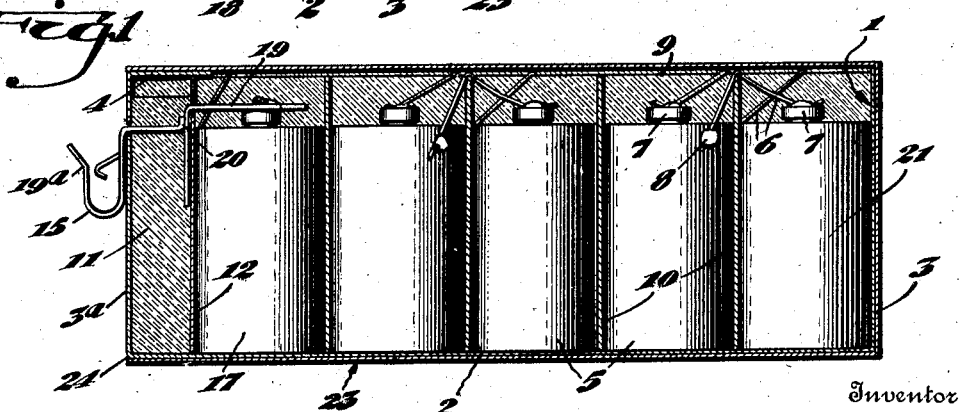

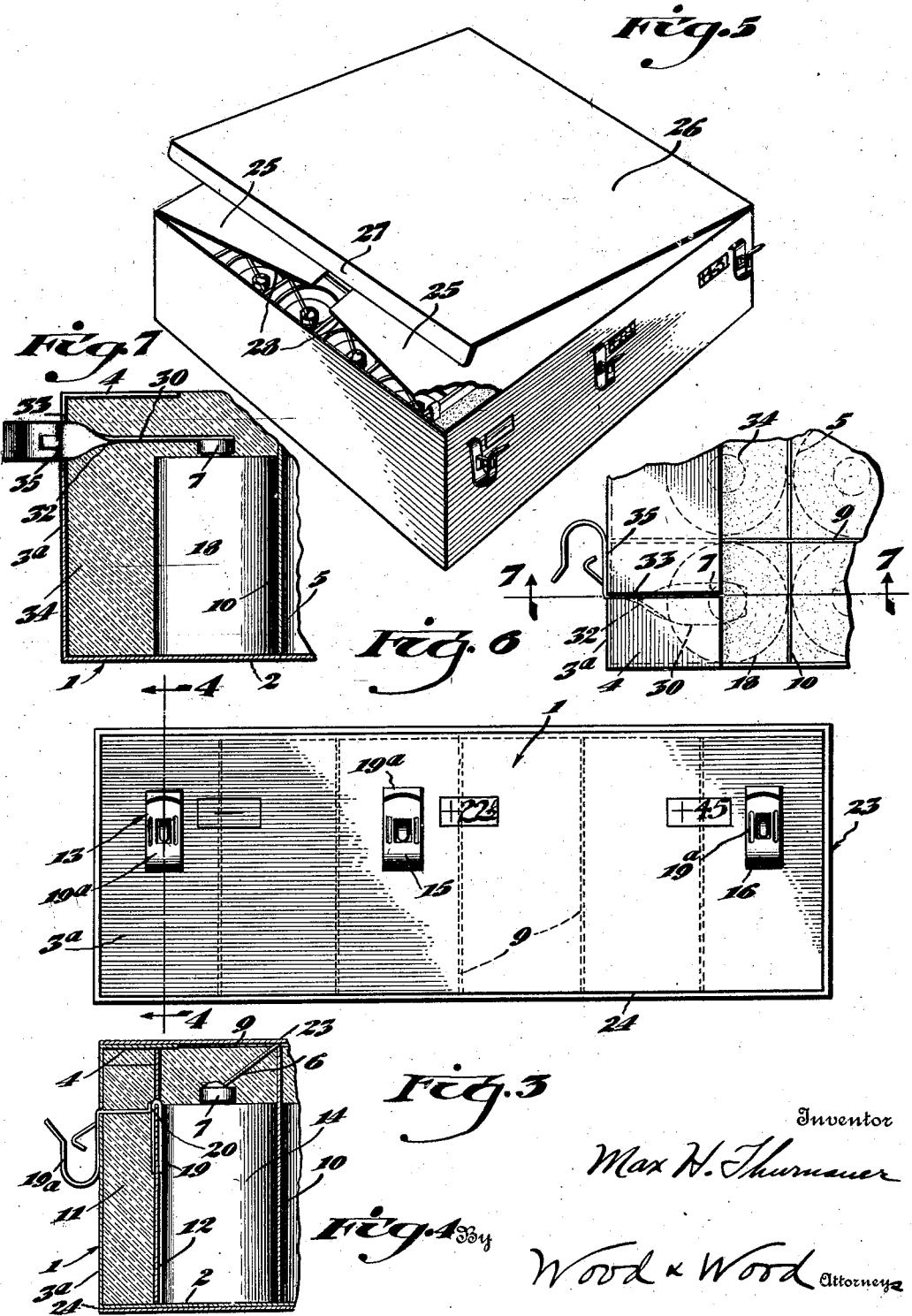

1,771,827

UNITED STATES PATENT OFFICE

MAX H. THURNAUER, OF CINCINNATI, OHIO

DRY BATTERY

Application filed April 7, 1928. Serial No. 268,334.

This invention relates to dry cell battery construction, and is particularly directed to the structure of the box or the container enclosing a plurality of unit cells and to the mounting of the terminals therein.

The well known type of battery provides unit cells electrically connected, each of a given voltage with connections arranged at various points in the built-up voltage for the use of the battery at a selected voltage output. Since a great many cells are necessary in this construction, for instance, a 45 voltage battery made up of 1½ volt cells, the container structure and the manner of assembly of these small unit cells becomes highly important in the fabrication of the battery. An additional item of importance is the arrangement and mounting of the output terminal clips at a common side of the battery.

An object of this invention is to provide a battery of the type described, in which the body or container structure and the arrangement of cells is such as to be convenient to assemble and economical to manufacture.

Another object is to provide a drawer and casing making up the body of the battery and housing the cells, which permits the use of light paper materials and which when assembled completely conceals the sealing compound permitting the use of cheaper grades and which disposes the terminal clips exterior of a printed casing wall, obviating the necessity of imprinting the voltage markings in the sealing compound.

Another object is to provide a container or drawer of such construction as to form a complete battery container without use in combination with an outer casing.

Another object is to provide an improved rigid mounting for the terminal clips.

Further objects and advantages will be more fully set forth in a description of the accompanying drawings, forming a part of this specification, in which:

Figure 1 is a top plan view of the improved battery, a portion of the top wall of the casing being broken away to disclose the unit cells, and portions of the forward end of the drawer or receptacle portion of the container broken away to disclose a terminal clip connection through the front wall of the receptacle to a cell of the series.

Figure 2 is a sectional view taken on line 2—2, Fig. 1, illustrating the partitioning of the unit cell receptacle and the output terminal connection to a cell of the series.

Figure 3 is a front view of the improved battery showing the voltage markings printed on the receptacle wall.

Figure 4 is a detail sectional view taken on line 4—4, Fig. 3, illustrating the manner of connecting the negative terminal to the first cell of the series.

Figure 5 is a perspective view of a modification showing a box which may be used independently of the casing as shown in the view, or which may be slid into a casing of the type indicated in the first views of the drawing.

Figure 6 is a fragmentary top plan view of a forward corner of another modified type of battery showing an arrangement of the terminals and box for ease in the assembly and the mounting of one-piece terminal clips.

Figure 7 is a sectional view taken on line 7—7 of Fig. 6.

Referring to the drawings, the battery cell container or receptacle is generally indicated at 1, and comprises, a bottom 2, side walls 3, and a top flap 4, extending inwardly from the upper edge of the front wall 3ª. A plurality of unit cells 5 are disposed in rows within the container 1. These cells are set within the container in upright position and are electrically connected by means of leads 6, extending in each instance from the positive pole 7 of one cell to the negative pole 8 of an adjacent cell. Partitions 9, preferably formed of cardboard covered with insulating compound, are disposed between the rows of cells. As shown in the drawings the partitions 9 extend from the forward end of the container to the rear end dividing the cells into rows, and the adjacent cells in the respective rows are separated by short partition walls 10, extending between the long strips. The leads making the electrical connections extend from the positive pole, which is centrally disposed at the top of the cell, over the partition wall to the zinc side wall of the adjacent cell.

The forward end of the container is provided originally with a chamber 11. This chamber is formed by insertion of a partition wall 12 spaced inwardly from the container front wall and extending parallel therewith from side to side of the container, the partition wall 12 marking the front wall of the true cell chamber. The chamber 11 may be designated a terminal installation chamber. The service or output terminals extending from certain cells in the series traverse this chamber and protrude exteriorly of the front wall of the casing. The negative terminal 13 extends (see Figure 4) from the zinc of the first cell of the series, namely, cell 14, and the positive terminals 15 and 16 extend from the positive poles of cells 17 and 18 respectively. The number of positive output service terminals may be varied, but with the particular series arrangement incorporated in the present drawing there are two terminals dividing the output of the battery into two stages.

The terminals are formed in two parts for purposes of assembly, and are made of bendable material for ease in forming them to their particular position. That part of the terminals attached to the cells themselves is indicated at 19 and in each case extends from the cell through the partition wall and is turned downwardly against the outer face thereof.

The clip or connector part of the terminals is indicated at 19ª. These elements are inserted through the forward wall of the container proper through slots formed therein, and in each instance are secured to their companion element by means of soldering a turned flange 20 to the body of the companion element. The clips may be of any commercial form at their outer or service connection ends.

For the purpose of bringing the number of output terminals used in this particular form through this terminal installation chamber, formed at a common side of the container, the following form of series connection is used. The cells beginning at cell 14, as the first cell of the series, are connected in a row to the back of the container, whereupon the connection is then made half-way across the back row of cells to cell 21. From this point the connection is forwardly through two parallel rows of cells in zigzag connection, that is, from a cell of one forwardly extending row across to the cell of the adjacent row, then forwardly one cell, then across to the first row again, etc. This arrangement brings up half the built-up voltage of the battery in cell 17, located adjacent the partition wall.

In the particular instance, the cells are 1½ volts so that using three rows of five each in a battery made up of six rows of five each, connection to the cell 16 delivers a voltage of 22½ volts. The series connection goes on from the cell 17 to the adjacent cell 22 in the forward row of cells and from there on the connection is in a similar manner to the first described half of the battery with a total output of 45 volts at terminal 16.

After the two parts of the terminals have been secured together by soldering, the chamber 11 is filled with sealing or insulating compound, this compound being poured in a liquid state and solidifying so as to form a solid wall in lieu of the chamber and to surround the terminals, securely embedding and locking them in the compound and thereby providing a staunch clip mounting. This sealing compound is poured to extend above the level of the terminals. The entire remaining space throughout the container is then filled with a cheaper form of compound which does not have to have the same requisites as the compound in the chamber, with regard to solidity. The flap 4 is then turned down over the top of the chamber 11.

A drawer-like receptacle is thus provided having the terminals extending from the forward wall thereof, with the top open.

A casing 23 is provided, being of rectangular form to fit snugly over the outside of the receptacle, but having one end thereof, or both if desired, open as at 24. The drawer-like receptacle is shoved within the casing through the open side 24 and is held by adhesive applied to the flap 4 and the bottom surface of the receptacle, this adhesive coating securing the top wall of the casing to the flap and the bottom of the container to the base of the casing.

This mode of battery box fabrication provides a box having the terminals extending from a common side, the box presenting an entirely cardboard appearance, with no sealing compound visible. This makes it possible to apply printing to the front wall, describing the voltage output at a particular terminal and the sealing compound is not visible.

In Figure 5 a modified form of battery box is illustrated. This box is similar to receptacle 1, with the exception of the top structure. It is provided with a pair of top flaps 25 extending inwardly from opposite sides, these flaps each having half the area of the total top area of the box. A third flap 26 of total top area extends from a side at right angles to the flaps 25 and has a tucking flap 27 at its outer end, this flap being tucked between the edges 28 of the flaps 25 and the inside of a side wall of the box.

The box shown in Figure 5 may be used as shown in the drawing as a complete battery or may be used in combination with a casing of the form previously described. In the latter event, the upper wall of the completed battery is of much greater strength inasmuch as it is three-ply. The weight of the cardboard used in making the modified form of box depends upon whether it is used as a completed box or in combination with the casing.

In Figures 6 and 7, a modified arrangement is shown at the forward end of the unit cell receptacle. In this type, one-piece terminal elements 30 are used. These terminals 30 have their inner ends soldered to the poles of the respective unit cells, the attachment to a positive pole 7 being shown in the views. The terminal clip has a horizontally disposed portion properly presenting the flat side of the metal for attachment to the pole and is twisted as at 32 into a vertical plane. A slot 33 is formed in the flap 4 for the insertion of each terminal clip, this slot also extending downward through the front wall of the box and being aligned vertically with the center of the particular unit cell. The terminal clips are secured to the cells prior to insertion of the cell into the receptacle, and the flap is held in a vertical position for passage of the vertically disposed portion of the clip down through the slot. The conventional outer clip end 35 then lies against the face of the forward wall and the clip edge engages the base of the slot. Sealing compound 34 is poured to fill the entire receptacle to the level of the open top, and the flap 4 is turned down thereagainst. The partitions 9 in this construction extend to the front wall 3ª. This type of clip attachment and slotted arrangement for the insertion thereof, aids greatly in the assembly of the cells and terminal clips in combination with a complete paper cardboard closure presenting a cardboard wall at the terminal side of the battery box. The clips are securely locked in position to withstand rough usage and the attachment of heavy connectors.

Having described my invention, I claim:

1. A battery structure, comprising, a plurality of unit cells electrically connected, a drawer-like container therefor, partitions between said cells, an inner partition spaced from and parallel to the casing front wall, output terminals extending from certain of the cells through the wall and partition, the forward wall and partition providing a terminal installation chamber, sealing compound within the chamber for giving body to the double wall structure, a flap on the top of said container front wall turned down to cover said chamber, and a casing for said drawer-like container, said casing sleeve-like for the insertion of the drawer-like container and the exterior disposition of the terminals.

2. A battery structure, comprising, a plurality of unit cells electrically connected, a drawer-like container therefor, spaced forward walls for said container, sectional output terminals extending from certain of the cells through the walls, said arrangement of the forward wall providing a terminal assembly chamber, insulating compound within the chamber for giving body to the double wall structure and rigidly mounting the terminals, and a casing for said drawer-like container, said casing having an open end for the insertion of the drawer-like container and the exterior disposition of the terminals.

3. A battery structure, comprising, a plurality of unit cells electrically connected, a container therefor, said container having spaced forward walls, output terminals extending from certain points in the series through the container spaced walls, and insulating filler set within said chamber for locking the terminals in place and constituting a thick forward wall.

4. A battery structure, comprising, a plurality of unit cells electrically connected, a container for said cells, said container being provided with flaps as the top wall thereof, and having a double forward wall, output terminals extending from certain points in the series through the container wall, said forward wall of the container forming a terminal installation chamber, and insulating compound set within the space within the battery including the installation chamber.

5. A battery structure, comprising, a drawer-like receptacle having spaced double walls for one end thereof, a plurality of electrically connected dry battery cells packed in said receptacle, terminal clips extended through slots in said double walls, and electrically connecting with said cells, sealing compound filling the space between said walls and embedding the portions of the terminal clips extended therethrough, and a casing for housing said receptacle.

6. A battery structure, comprising, a drawer-like container, a plurality of unit cells mounted therein, a forward row of said cells spaced from the front wall of the container, terminals extending from said forward cells through slots formed from the upper edge of the forward wall of the container, said terminals having a laterally extending clip portion engaging the front face of the container, and insulating filler set around the terminals in the space between the cells and the forward wall of the container.

In witness whereof, I hereunto subscribe my name.

MAX H. THURNAUER.